United States Patent
Procter et al.

(10) Patent No.: US 9,831,509 B2
(45) Date of Patent: Nov. 28, 2017

(54) SEPARATING DEVICE FOR A FUEL CELL SYSTEM, FUEL CELL SYSTEM WITH THE SEPARATING DEVICE AND METHOD FOR OPERATING THE SEPARATING DEVICE

(75) Inventors: Michael Procter, North Vancouver (CA); Richard Fellows, Vancouver (CA)

(73) Assignee: DAIMLER AG, Stuttgart (DE)

( * ) Notice: Subject to any disclaimer, the term of this patent is extended or adjusted under 35 U.S.C. 154(b) by 776 days.

(21) Appl. No.: 14/343,615

(22) PCT Filed: Aug. 16, 2012

(86) PCT No.: PCT/EP2012/003478
§ 371 (c)(1),
(2), (4) Date: May 15, 2014

(87) PCT Pub. No.: WO2013/034243
PCT Pub. Date: Mar. 14, 2013

(65) Prior Publication Data
US 2014/0242481 A1     Aug. 28, 2014

(30) Foreign Application Priority Data

Sep. 9, 2011   (DE) .................. 10 2011 113 020

(51) Int. Cl.
*H01M 8/04119* (2016.01)
*H01M 8/04007* (2016.01)
(Continued)

(52) U.S. Cl.
CPC ... *H01M 8/04164* (2013.01); *H01M 8/04007* (2013.01); *H01M 8/04097* (2013.01);
(Continued)

(58) Field of Classification Search
None
See application file for complete search history.

(56) References Cited

U.S. PATENT DOCUMENTS

| 8,252,469 B2 | 8/2012 | Naganuma |
| 2008/0318093 A1* | 12/2008 | Lee ................... H01M 8/04097 429/435 |

FOREIGN PATENT DOCUMENTS

| DE | 10 2007 061 959 A1 | 6/2009 |
| DE | 11 2007 002 278 T5 | 9/2009 |

(Continued)

OTHER PUBLICATIONS

Arai et al. (JP, 2005-262042) (a raw machine translation) (Abstract, Detailed Description and Drawings) (Sep. 29, 2005).*

(Continued)

*Primary Examiner* — Miriam Stagg
*Assistant Examiner* — Carmen Lyles-Irving
(74) *Attorney, Agent, or Firm* — Crowell & Moring LLP

(57) ABSTRACT

A device for separating a fluid having a water and gas portion in a fuel cell system includes a fluid inlet an a fluid outlet with an outlet valve. The separating device includes a first reservoir region for collecting the water portion of the fluid. The first reservoir region includes a first outlet to feed the water portion in the direction of the fluid outlet. The separating device also includes a second reservoir region having a second outlet that feeds the water portion in the direction of the fluid outlet so that the first reservoir region 19 is connected in series in terms of flow via the second reservoir region with the fluid outlet. In an installation position of the separating device the first outlet is arranged lower than the second outlet so that deposits of the water portion completely covering the first outlet are prevented from flowing away.

5 Claims, 4 Drawing Sheets

Figure 1:
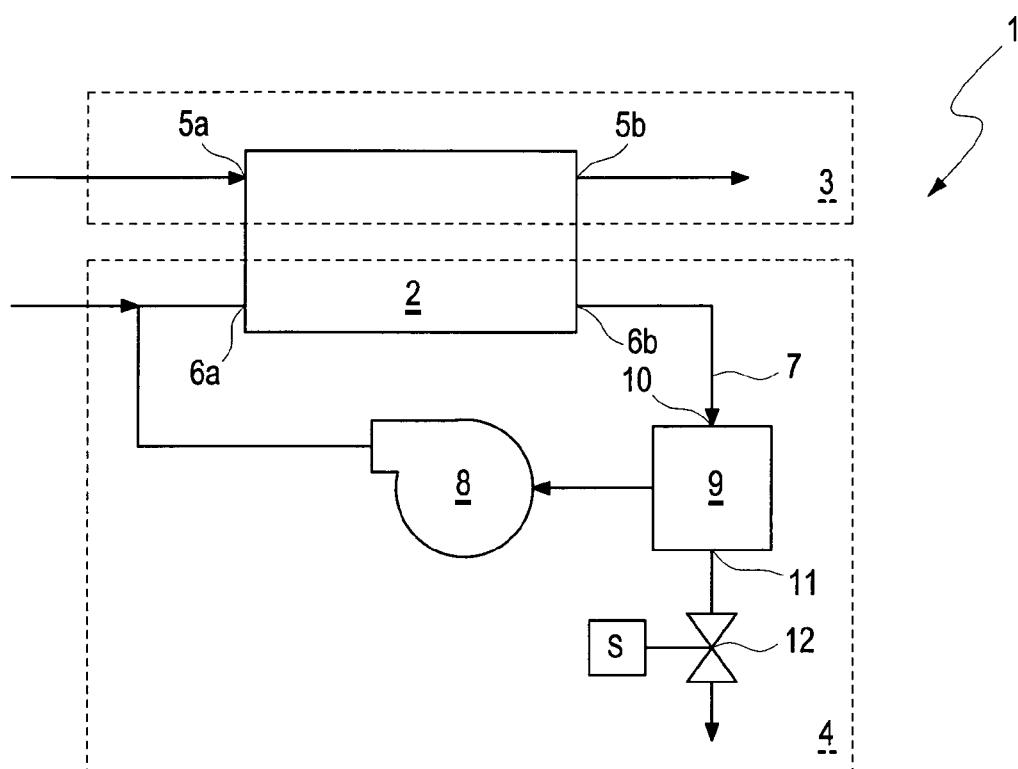

(51) Int. Cl.
*H01M 8/04089* (2016.01)
*H01M 8/04223* (2016.01)

(52) U.S. Cl.
CPC ... *H01M 8/04141* (2013.01); *H01M 8/04231* (2013.01); *H01M 8/04253* (2013.01); *H01M 2250/20* (2013.01); *Y02T 90/32* (2013.01)

(56) References Cited

FOREIGN PATENT DOCUMENTS

| | | |
|---|---|---|
| GB | 1 217 214 A | 12/1970 |
| JP | 2005-262042 A | 9/2005 |

OTHER PUBLICATIONS

Takashi et al. (JP, 2005-262042) (a raw machine translation) (Sep. 29, 2005).*
Hiroshi et al. (JP, 2001-015135) (a raw machine translation) (Jan. 19, 2001).*
International Search Report (PCT/ISA/220 and PCT/ISA/210) dated Dec. 13, 2012 (4 pages).
Written Opinion (PCT/ISA/237) dated Dec. 13, 2012 (5 pages).

* cited by examiner

SEPARATING DEVICE FOR A FUEL CELL SYSTEM, FUEL CELL SYSTEM WITH THE SEPARATING DEVICE AND METHOD FOR OPERATING THE SEPARATING DEVICE

BACKGROUND AND SUMMARY OF THE INVENTION

Exemplary embodiments of the invention relate to a separating device for a fluid from a fuel cell system, wherein the fluid has a water and a gas portion, with a fluid inlet for supplying the fluid, with a fluid outlet for removing the fluid or a portion thereof, with an outlet valve which controls the fluid outlet and with a first reservoir region, in which the water portion of the fluid is collected, wherein the first reservoir region comprises a first outlet in order to feed the water portion in the direction of the fluid outlet. Exemplary embodiments of the invention also relate to a fuel cell system with the separating device and to a method for operating the separating device.

Fuel cell systems convert chemical energy into electrical energy. For this purpose a fuel, mostly hydrogen, is mixed by means of an electrochemical process with an oxidant, mostly ambient air, in order to generate the electrical energy. The electrochemical process produces very clean outlet gases, as well as water that can advantageously be used in part to moisten a membrane of the fuel cells or the oxidant in the fuel cell system. However, the production of the water portion is so great that during a fairly long operation water must be removed from the fuel cell system. The removal of the water portion can be realized, for example, by a removal line which is connected by means of a valve.

In particular in the case of fuel cell systems in which the partially consumed fuel is recirculated from a fuel cell outlet in a circulation branch into a fuel cell inlet the gas present in the recirculation branch or in the fuel cell can become contaminated, for example, by nitrogen ($N_2$). In this case in many fuel cell systems a drain line—a so-called purge line—is provided, via which the gas can be separated from the recirculation branch or from the fuel cell in an impulse-like manner.

Since the fuel cell systems are intended to be used and are used as an energy source suitable for everyday use for driving vehicles, the fuel cell systems must also be able to work in a reliable way with changing environmental conditions. In particular, freezing of the water portion in the fuel cell system constitutes a technical challenge. For this reason it is possible to provide the drain lines for the water and the gas separately with two outlet valves so that when the water portion freezes the gas can still be reliably expelled via the second drain line.

German patent document DE 11 2007 002 278 T5 discloses using a gas/water discharge valve in a fuel cell system for simultaneous realization of the discharge of gas and water. The number of outlet valves can thus be reduced. The problem of freezing of the water portion is averted in that the water temperature is detected by means of a sensor and an expulsion of the gas/water portion only takes place when the water temperature exceeds a predefined threshold.

Exemplary embodiments of the present invention are directed to a separating device for a fuel cell system having a reliable operating behavior. Exemplary embodiments of the present invention are also directed to a fuel cell system with the separating device and a method for operating the separating device.

Within the scope of the invention a separating device is provided that is suitable and/or designed for a fluid from a fuel cell system. The fluid comprises a water and a gas portion. The gas portion is particularly preferably formed by fuel, in particular hydrogen, from the fuel cell system possibly with impurities such as, for example, nitrogen. The water portion is in gaseous or liquid form and has preferably been formed by the electrochemical conversion of the fuel and the oxidant in the fuel cell system.

The separating device comprises a fluid inlet, via which the fluid is fed, for example, from a fuel cell stack of the fuel cell system. The separating device further comprises a fluid outlet, via which the fluid or parts thereof are removed. The fluid outlet can be controlled through an outlet valve. In particular the fluid outlet can be opened and closed by the outlet valve.

The separating device is formed to separate the water portion from the fluid and to expel the water portion and/or the gas portion via the fluid outlet, e.g. into the environment or in the direction of a consumer.

Particularly preferably the separating device comprises precisely one fluid outlet for removing or expelling and/or precisely one outlet valve, wherein both the water portion and the gas portion can be removed or expelled via this common fluid outlet or via the common outlet valve.

In the separating device a first reservoir region is provided, in which the water portion, in particular the liquid water portion, of the fluid is collected and which comprises a first outlet in order to convey the water portion in the direction of the fluid outlet. In the first reservoir region the water portion is thus brought together wherein the first reservoir region is connected in terms of flow to the fluid outlet, wherein—as set out further below—further flow elements and components can be intermediately arranged.

Within the scope of the invention the separating device should include a second reservoir region comprising a second outlet, which feeds or further feeds the water portion in the direction of the fluid outlet. The first reservoir region is thus initially connected in series in terms of flow via the first outlet to the second reservoir region and the second reservoir region via the second outlet to the fluid outlet.

A water portion can thus flow from the first reservoir region via the first outlet into the second reservoir region and then via the second outlet into the fluid outlet. In particular, this flow path is the only connection between the first reservoir region and the fluid outlet for the liquid water portion in regular operation, i.e. without overflowing of the first reservoir region.

If one considers a proper installation position of the separating device the first outlet is arranged lower than the second outlet. The height difference between the first and the second outlet leads to deposits of the water portion being hindered from flowing away in the first and the second reservoir region below the second outlet whereby these deposits completely cover the first outlet. It is thus constructively predefined that the first outlet that connects the first reservoir region and the second reservoir region is always completely covered by the deposits of the water portion.

It is thereby a consideration of the invention that it is advantageous to provide the outflow of the water portion and the gas portion via a common fluid outlet and preferably via a common outlet valve. To date there was the problem that this common fluid outlet can freeze at temperatures below 0° C. due to the water portion and thus block both the removal of the water portion and also the gas portion.

Due to the fact that the separating device is designed so that deposits of the water portion constantly remain in the separating device that completely cover the first outlet the problem of freezing of the common fluid outlet or the common outlet valve is elegantly solved: At temperatures below 0° C. these deposits of the water portion will naturally freeze. The first outlet is thereby closed in a reliable manner for the process. Flowing away of the water portion from the first reservoir region into the fluid outlet is prevented so long as the deposits of the water portion have frozen and the first outlet is thereby completely closed.

The gas portion can, on the other hand, pass freely through the fluid outlet so that also in operation below 0° C. and with frozen deposits of the water portion the gas portion can be reliably expelled via the fluid outlet and the outlet valve.

The separating device preferably comprises a gas feed device for feeding the gas portion that is coupled in terms of flow with the fluid outlet and which comprises an inlet above the first and/or second outlet. The inlet is preferably arranged so that even with a greatly filled reservoir region, thus with a higher fluid level, the gas portion can be fed without hindrance to the fluid outlet.

With a possible constructive embodiment of the invention the first outlet is incorporated in or on a first pipe body and the second outlet in or on a second pipe body, wherein the second pipe body is arranged within the first pipe body. The inner space of the second pipe body is connected in terms of flow with the fluid outlet and additionally forms the gas feed device. The water portion is thus fed through the first outlet into an intermediate space between the pipe bodies and then via the second outlet to the fluid outlet. The gas portion can on the other hand pass through an open end section or further passages as an inlet in the second pipe body and independently of the water portion reach the fluid outlet.

In principle it is also possible that the cross-section of the first and the second pipe body is designed, for example, in the manner of a polygon or with multiple corners or has a free form. It is also possible for the pipe bodies to respectively be formed as multi-part components.

In a particularly preferred embodiment of the invention, which can be implemented particularly simply in terms of production, the first and/or the second pipe body are formed as a straight hollow cylinder, thus as a pipe with circular cross-section, and are arranged coaxially and/or concentrically in relation to each other. The first reservoir region is thus, radially observed, outside of the first pipe body and the second reservoir region between the two pipe bodies. The first outlet can be formed as one or more passage openings or perforations in the bottom region of the first pipe body, the second outlet in the same variations but offset in height in relation to the first outlet.

In a possible embodiment of the invention it is claimed that the upper edge or at least a section of the upper edge of the first pipe body is arranged lower than the upper edge or at least a part section of the upper edge of the second pipe body. This embodiment is based upon the consideration that when the first outlet is closed and during operation of the fuel cell system the level increases in the first reservoir region. In order to now ensure that the gas portion can reliably reach the fluid outlet at any time the upper edges are selected so that the water portion initially reaches the upper edge of the first pipe body and then enters the second reservoir region. It can be provided that the water portion can flow away via the second outlet into the fluid outlet or—on the basis of the still present frozen deposits—also freezes and likewise closes the second outlet. In the last case the water portion can further increase until the upper edge of the second pipe body is reached. It is only at this level that the water portion can again reach the fluid outlet. An additional safety reserve in frost operation is thus produced through the offset of the upper edges of the two pipe bodies.

In an alternative of the invention the height of the upper edge or at least a section of the upper edge of the first pipe body is arranged higher than the upper edge or at least a partial section of the upper edge of the second pipe body. This embodiment ensures that if the first outlet is frozen the level must rise very high until the water portion can reach the fluid outlet or the second outlet.

In a possible further development of the invention the first reservoir region comprises a bottom section and a supply section wherein the bottom section assumes in a horizontal plane, in particular in the middle, a smaller area than the supply section. The bottom section is preferably dimensioned in height so that it ends at the same height with the second outlet so that the deposits are fixed through the bottom section. This further development of the invention is based upon the consideration that the whole heat capacity of the deposits of the water portion is kept low in the bottom section in that the volume available is kept low in the bottom section for the water portion.

In case of a start-up of the fuel cell system with a frozen start therefore only the comparatively narrow bottom section must thaw until it is possible to dispose of the water portion again via the fluid outlet.

A further aspect of the invention relates to a fuel cell system for a vehicle with one or more fuel cell stacks and also a separating device as was previously described.

In a first alternative the separating device can be arranged in a recirculation branch that recirculates partially consumed fuel gas from the fuel cell stack into the fuel cell stack.

In a second alternative embodiment the separating device is arranged in an outlet branch that discharges partially consumed fuel gas from the fuel cell stack.

In a third alternative embodiment the separating device is arranged in an outlet branch that discharges moistened oxidant gas from a water-heat exchanger.

In the first two embodiments mentioned the gas portion is formed as a mixture of fuel, in particular hydrogen, and impurities such as for example nitrogen. In the third alternative the gas is formed as an ambient air.

In order to bring the separating device as quickly as possible into an operation-ready state to output the water portion the separating device can be thermally coupled with the fuel cell stack in order to accelerate the thawing of the deposits.

It is particularly preferably provided that the thermal coupling is designed so that the heat flow preferably initially reaches the supply section and subsequently the bottom section in order to ensure that the deposits are only thawed in the bottom section when the water portion has reached a temperature in a supply section that allows safe drainage through the fluid outlet or through the outlet valve.

The separating device is particularly preferably tempered through a coolant from the cooling circuit of the fuel cell stack. The coolant is brought very early through the fuel cell stack to a temperature above 0° C. so that a quick heating of the separating device takes place through the tempering of the separating device by means of the coolant. The coolant can also flow through the separating device, the heat flow thus takes place via convection.

In alternative embodiments the separating device is flanged, for example, with a flange planarly against a warm region of the fuel cell stack so that the heat flow is realized through heat conduction.

A further aspect of the invention relates to a method for operating the previously described separating device and/or the fuel cell system with the separating device as previously described. In particular the subject matter relates to a method for securing the separating device.

In the method during the operation of the separating device a water portion of the fluid is collected in the first and in the second reservoir region. Already during the collection of the fluid the water portion runs out via the first and the second outlet. Due to the height difference of the outlets, however, deposits of the water portion are prevented from flowing away, wherein the deposits completely cover the first outlet. In case of freezing of the deposits the first outlet is blocked so that no water portion can pass via the first outlet into the fluid outlet.

When the separating device is thawed the deposits are thawed through heating of the fuel cell system, wherein after thawing the first outlet can be passed through in terms of flow so that after thawing a water portion can pass via the first outlet into the fluid outlet.

BRIEF DESCRIPTION OF THE DRAWINGS FIGURES

Figure 2:
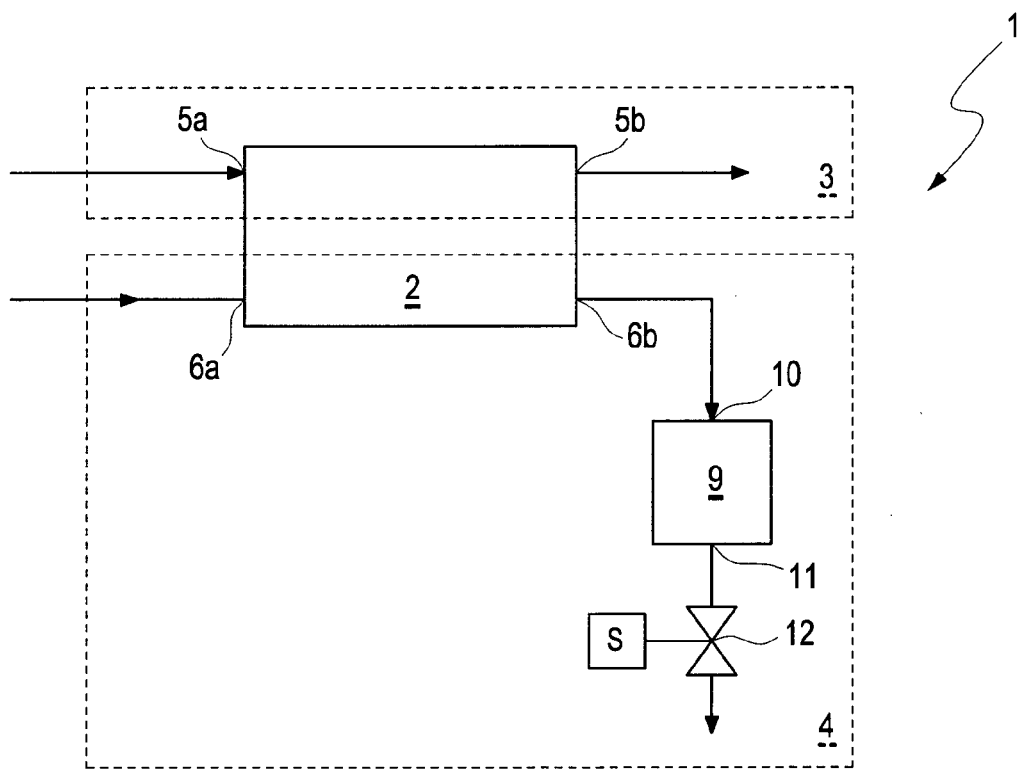
Figure 3:
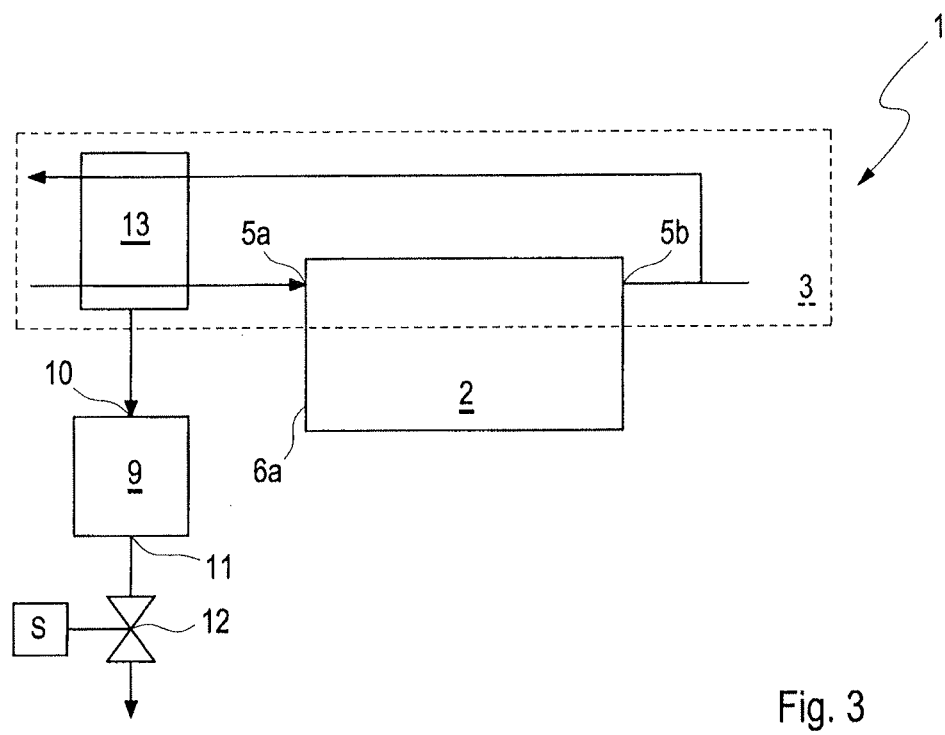
Figure 4:
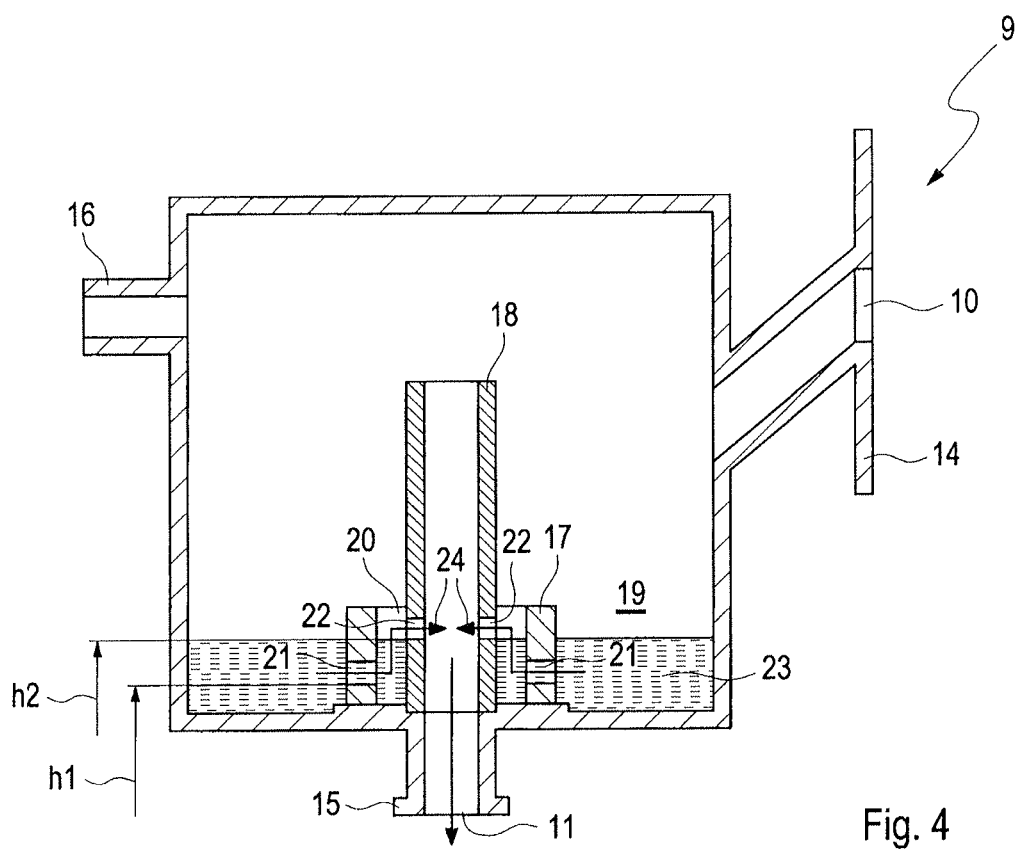
Figure 5:
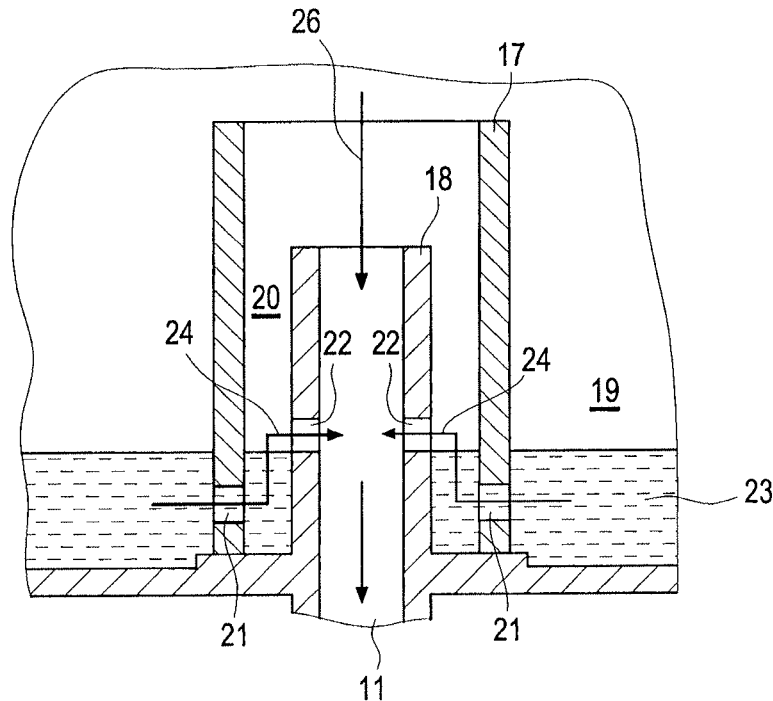
Figure 6:
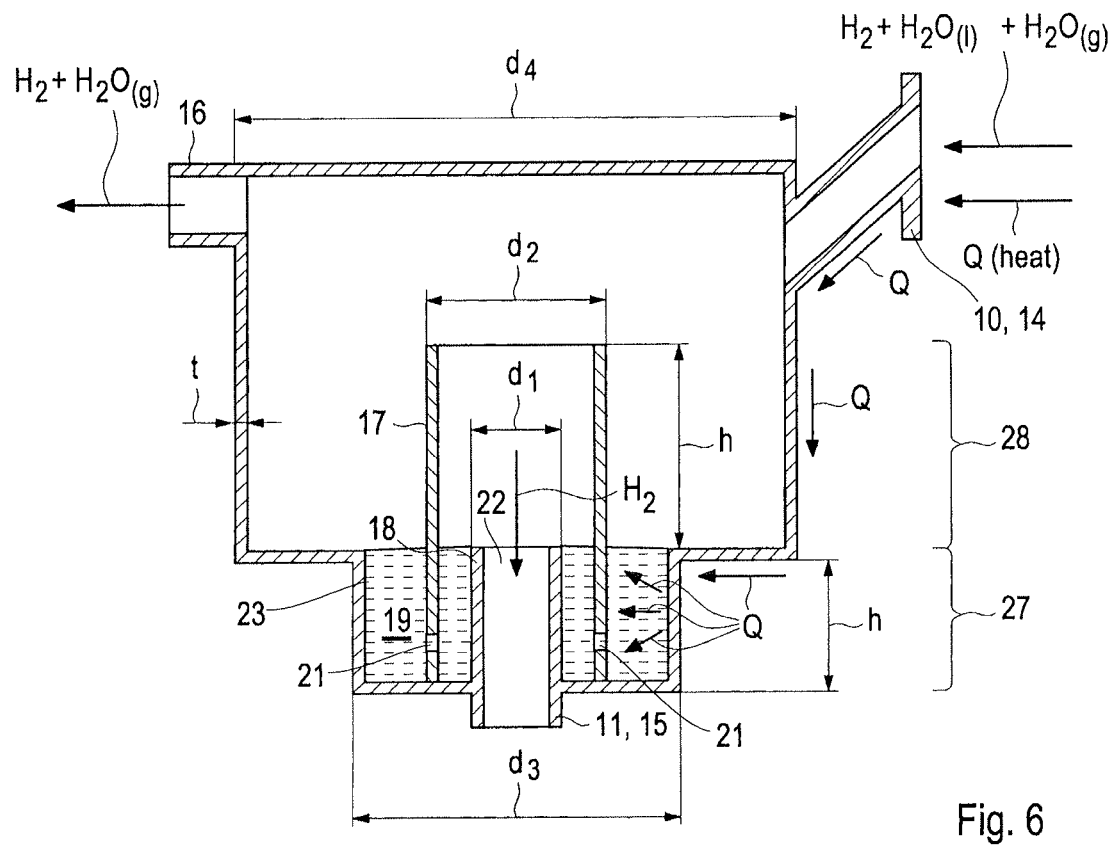
Figure 7:
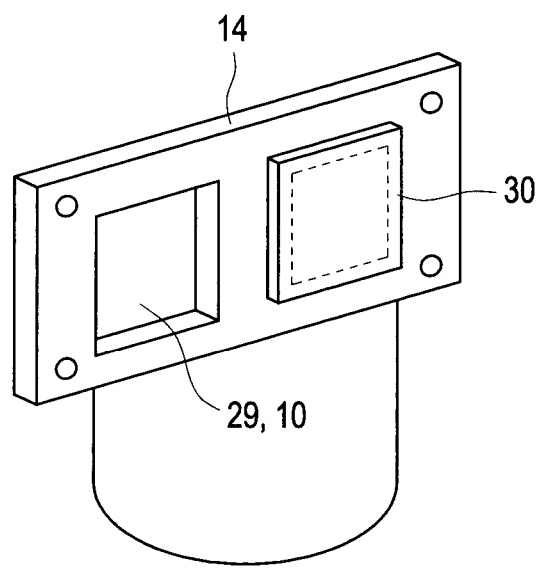

Further features, advantages and effects of the invention follow from the following description of preferred embodiments of the invention, in which:

FIG. 1 shows a schematic block diagram of a fuel cell system as a first embodiment of the invention;

FIG. 2 in the same representation as FIG. 1, a fuel cell system as a second embodiment of the invention;

FIG. 3 in the same representation as the preceding figures, a third embodiment of a fuel cell system;

FIG. 4 a first embodiment for a separating device of the fuel cell systems of the previous figures;

FIG. 5 a possible variant of the separating device in a schematic enlargement;

FIG. 6 a third alternative for a separating device;

FIG. 7 a fourth alternative for a separating device.

DETAILED DESCRIPTION

FIG. 1 shows in a schematic block diagram a fuel cell system 1, which is used, for example, in a vehicle to generate drive energy for moving the vehicle. It is in particular a mobile fuel cell system.

FIG. 1 illustrates a fuel cell system 1 with a fuel cell stack 2, which comprises for example more than 50 individual fuel cells, and also a cathode gas supply 3 and an anode gas supply 4. In particular, the full cells can be low temperature proton exchange membrane fuel cells PEMFC or PEFC. The cathode gas supply 3 provides an oxidant, in this example ambient air, which is introduced via a cathode inlet 5a into the fuel cell stack 2 and wherein the non-consumed oxidant leaves the fuel cell stack 2 again via a cathode outlet 5b.

In the anode gas supply 4 a fuel, in this example hydrogen, is introduced from a source (not shown) such as a tank via an anode inlet 6a into the fuel cell stack 2 and leaves this partially consumed via an anode outlet 6b. An electrochemical reaction takes place in the fuel cell stack 2 between the oxidant and the fuel wherein oxygen and hydrogen are transformed in order to generate electrical energy. Due to the electrochemical reaction and due to the fact that not only pure oxygen but also essentially an oxygen-nitrogen mixture is fed via the cathode inlet 5a a mixture of oxygen, nitrogen and water leaves at the cathode outlet 5b and a mixture of hydrogen, nitrogen and water at the anode outlet 6b.

The anode outlet 6b leads to a recirculation branch 7 which recirculates the leaving, partially consumed fuel again to the anode inlet 6a. For an acceleration of the partially consumed fuel a recirculation pump 8 is incorporated into the recirculation branch 7 in terms of flow.

Since the nitrogen is not consumed in operation and also because the electrochemical reaction water collects in the recirculation branch 7 a separating device 9 is provided which is connected in terms of flow between the anode outlet 6b and the anode inlet 6a. A fluid including a gas portion, namely partially consumed hydrogen and nitrogen, and also a water portion are thus fed via a fluid inlet 10 to the separating device 9.

The separating device 9 carries out two functions: First, the water portion is separated from the fluid and in this way removed from the recirculation branch 7. Second, the separating device 9 comprises a fluid outlet 11 that can be controlled via a valve 12 subsequently arranged in terms of flow, wherein upon opening of the valve 12 via the fluid outlet 11 the gas portion and/or the water portion of the fluid can be let out. By letting out the water portion this is definitively removed from the recirculation branch 7. By letting out the gas portion a so-called purge is carried out, wherein a gas portion that is loaded too high with a nitrogen portion or other impurities is expelled from the recirculation branch 7.

FIG. 2 shows a modification of the fuel cell system 1 in FIG. 1, wherein the fuel cell system 1 does not comprise a recirculation branch 7 in FIG. 2. Instead the separating device 9 is formed exclusively for letting out the fluid, in particular the gas portion and the water portion.

FIG. 3 shows a further variant of the fuel cell system 1 in which, for ease of illustration, the anode gas supply 4 has been completely omitted. It can be seen in the cathode gas supply 3 that the partially consumed oxidant is now recirculated from the cathode outlet 5b in the direction of the cathode inlet 5a and is introduced into a heat/moisture exchanger 13, in which a feed to the cathode inlet 5a is arranged. Heat and/or moisture is passed in the heat/moisture exchanger 13 from the oxidant leaving the cathode outlet 5b to the oxidant entering the cathode inlet 5a. A separating device 9 can also prove meaningful for the fluid at this position.

FIG. 4 shows a first embodiment of the separating device 9 as can be integrated in particular into the fuel cell system 1 of FIG. 1. On the right side a first flange 14 forms the fluid inlet 10. On the lower side a second flange 15 forms the fluid outlet 11. On the left side a third flange 16 provides a coupling of the flow of the separating device 9 with the recirculation branch 7. The third flange 16 is closed in embodiments of the separating device 9 for the fuel cell systems 1 in FIGS. 2 and 3.

In operation the fluid is introduced through the first flange 14 or the fluid inlet 10 into the separating device 9 from the recirculation branch 7 and removed again via the third flange 16 to the recirculation branch 7. By means of the second flange 15 or the fluid outlet 11 the water portion or the gas portion of the fluid can be let out via the valve 12.

The inner space of the separating device 9 shown with a rectangular cross-section comprises a first pipe body 17 and a second pipe body 18 which are arranged coaxially and concentrically with each other. The second pipe body 18 is arranged or orientated in an imaginary extension of the second flange 15 or the fluid outlet 11 and is connected to it in terms of flow. The first pipe body 17 is placed on a bottom of the separating device 9. Outside of the first pipe body 17 there is a first reservoir region 19, between the first pipe body 17 and the second pipe body 18 there is a second reservoir region 20. The second reservoir region 20 can be formed for example as an annular gap.

On the bottom side in the first pipe body 17 first outlets 21 are arranged connecting the first reservoir region 19 with the second reservoir region 20 in terms of flow. The second pipe body 18 comprises second outlets 22 connecting the second reservoir region 20 in terms of flow to the inner space of the second pipe body 18 and thus the fluid outlet 11. In the installation position of the separating device 9 the first outlets 21 are arranged at a height h1 and the second outlets 22 at a second height h2 whereby h2 is greater than h1.

In the separating device 9 deposits 23 of a water portion are shown schematically. The deposits 23 extend as far as the lower edge of the second outlets 22. If a further water portion is introduced through the fluid inlet 10 into the separating device 9 the level rises and the water portion flows via the second outlets 22 to the fluid outlet 11. Through the constructive arrangement of the first and second outlets 21, 22, however, it is ensured that at least the deposits 23 are constantly in the separating device 9.

FIG. 5 shows the region around the fluid outlet 11 once again graphically enlarged. The arrow 24 symbolizes the flow of the water portion from the first reservoir region 19 via the second reservoir region 20 to the fluid outlet 11.

As soon as the ambient temperatures, in particular the inner temperature of the fuel cell system 1, sink so far below 0° C. that the water portion freezes in the separating device 9 the deposits 23 freeze. Since the first outlets 21 are completely covered by the deposits 23 freezing of the deposits 23 leads to a closure of the first outlets 21. If a further water portion is incorporated in this state via the fluid inlet 10 into the separating device 9 the level does indeed increase in the first reservoir region 19 but no water can pass to the fluid outlet 11 so long as the level is not higher than the upper edge of the first pipe body 17.

On the other hand, a gas portion can be let out via the fluid outlet 11 and the valve 12 as this can pass following the arrow 26 through a cover-side opening of the second pipe body 18 as an inlet unhindered, in particular independently of an icing up of the deposits 23, to the fluid outlet 11.

The separating device 9 thus allows, in case of icing up or a frost start of the fuel cell system 1, the water portion to be kept back and only the gas portion to pass to the fluid outlet 11. Icing up of the fluid outlet 11 or the valve 12 through the water portion is thus excluded and the separating device 9 functions even in the region of frost reliably although a common fluid outlet 11 and a common valve 12 are used for the water portion and the gas portion.

FIG. 6 shows a further possible embodiment of the separating device 9, wherein in relation to the height the first reservoir region 19 comprises a bottom section 27 and a supply section 28 arranged above it. The bottom section 27 extends from the bottom of the separating device 9 to the upper edge of the second pipe body 18, wherein the upper free opening thereof in this embodiment forms the second outlet 22. In the previous examples the bottom section thus extends as far as the second outlets 22. The supply section 28 extends as far as the upper edge of the first pipe body 17. The bottom section 27 is clearly narrower than the supply section 28. If one observes the cross-section area perpendicular to the height extension the cross-section area of the bottom section 27 is smaller than the cross-section area of the supply section 28. This embodiment leads to the deposits 23 only having a small volume so that the deposits 23 can be quickly thawed upon operation. The supply section 28, which is broadened in relation to the bottom section 27, allows a large volume of water to be taken up.

In operation therefore if the first outlets 21 are closed through icing up of the deposits 23 the level can increase in the first reservoir region 19 until the upper end of the supply section 28 without hindering the removal of the gas portion.

FIG. 6 likewise schematically shows that heat energy Q is supplied to thaw the deposits 23 via the first flange 14. The first flange 14 is arranged in the cover region of the separating device 9 so that the supplied heat must initially be fed via the walls of the supply section 28 until it can thaw the deposits 23 in the bottom section 27. This embodiment has the advantage that it is ensured that the water portion existing in the supply section 28 is initially thawed/heated and only then the deposits 23 are thawed and the first outlets 21 are released. Through this sequence it is ensured in fact that the water leaving via the fluid outlet 11 is sufficiently warm in order to prevent icing up of the valve 12.

FIG. 6 additionally shows different dimensions with letters in order to indicate that by changing the dimensions the operating properties can be changed: In case of a change in the ratio d2/d3 for example the volume of the deposits 23 and thus the required time for thawing of the first outlets 21 can be set. By means of the heights h the receiving volumes of the bottom section 27 and the supply section 28 can be set. Through the wall thickness t, influence is possible via the heat conductivity.

FIG. 7 shows a modification of the exemplary embodiment in FIG. 6, wherein the first flange 14 comprises a first passage region 29 forming the fluid inlet 10 and a second passage region 30 that is completely covered by a seal.

The second passage region 30 is brought into thermal contact with a cooling region of the fuel cell system 1 so that the heat energy is introduced from the cooling region into the separating device 9 in order to thaw or temper the deposits there.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

1 Fuel cell system
2 Fuel cell stack
3 Cathode gas supply
4 Anode gas supply
5a Cathode inlet
5b Cathode outlet
6a Anode inlet
6b Anode outlet
7 Recirculation branch
8 Recirculation pump
9 Separating device
10 Fluid inlet
11 Fluid outlet
12 Valve
13 Heat/moisture exchanger
14 First flange
15 Second flange
16 Third flange
17 First pipe body
18 Second pipe body
19 First reservoir region
20 Second reservoir region
21 First outlets 22 Second outlets
23 Deposits
24 Arrow
26 Arrow
27 Bottom section
28 Supply section
29 First passage region
29 Second passage region

The invention claimed is:

1. A separating device for a fluid from a fuel cell system, wherein the fluid comprises a water portion and a gas portion, the separating device comprising:
   a fluid inlet configured to feed the fluid;
   a fluid outlet configured to remove the fluid or a part of the fluid;
   an outlet valve configured to control the fluid outlet;
   a first reservoir region configured to collect the water portion of the fluid, wherein the first reservoir region comprises a first outlet configured to feed the water portion in a direction of the fluid outlet; and
   a second reservoir region comprising a second outlet configured to feed the water portion in the direction of the fluid outlet,
   wherein the first reservoir region is connected in series in terms of flow via the second reservoir region to the fluid outlet,
   wherein in an installation position of the separating device the first outlet is arranged lower than the second outlet, so that deposits of the water portion completely covering the first outlet are prevented from flowing away,
   wherein the first outlet is incorporated in or on a first pipe body and the second outlet is incorporated in or on a second pipe body, wherein the second pipe body is arranged within the first pipe body,
   wherein an upper edge of the first pipe body is arranged lower than an upper edge of the second pipe body.

2. The separating device according to claim 1, wherein the first or second pipe body have the form of a straight hollow cylinder and are arranged coaxially or concentrically with respect to each other.

3. A separating device for a fluid from a fuel cell system, wherein the fluid comprises a water portion and a gas portion, the separating device comprising:
   a fluid inlet configured to feed the fluid;
   a fluid outlet configured to remove the fluid or a part of the fluid;
   an outlet valve configured to control the fluid outlet;
   a first reservoir region configured to collect the water portion of the fluid, wherein the first reservoir region comprises a first outlet configured to feed the water portion in a direction of the fluid outlet; and
   a second reservoir region comprising a second outlet configured to feed the water portion in the direction of the fluid outlet,
   wherein the first reservoir region is connected in series in terms of flow via the second reservoir region to the fluid outlet,
   wherein in an installation position of the separating device the first outlet is arranged lower than the second outlet, so that deposits of the water portion completely covering the first outlet are prevented from flowing away,
   wherein the first reservoir region comprises a bottom section and a supply section, wherein the bottom section has a smaller area in a horizontal plane than the supply section.

4. A method for operating a separating device comprising a fluid inlet configured to feed the fluid, a fluid outlet configured to remove the fluid or a part of the fluid, an outlet valve configured to control the fluid outlet, a first reservoir region configured to collect the water portion of the fluid, wherein the first reservoir region comprises a first outlet configured to feed the water portion in a direction of the fluid outlet, and a second reservoir region comprising a second outlet configured to feed the water portion in the direction of the fluid outlet, wherein the first reservoir region is connected in series in terms of flow via the second reservoir region to the fluid outlet, wherein in an installation position of the separating device the first outlet is arranged lower than the second outlet, so that deposits of the water portion completely covering the first outlet are prevented from flowing away, wherein the first outlet is incorporated in or on a first pipe body and the second outlet is incorporated in or on a second pipe body, wherein the second pipe body is arranged within the first pipe body, wherein an upper edge of the first pipe body is arranged lower than an upper edge of the second pipe body, the method comprising:
   collecting, during operation of the separating device, the water portion of the fluid in the first and in the second reservoir region,
   wherein the water portion runs away via the first and the second outlet,
   wherein deposits of the water portion completely covering the first outlet are prevented from flowing away,
   wherein upon freezing of the deposits the first outlet is blocked so that no water portion can pass via the first outlet into the fluid outlet.

5. A method for operating a separating device comprising a fluid inlet configured to feed the fluid, a fluid outlet configured to remove the fluid or a part of the fluid, an outlet valve configured to control the fluid outlet, a first reservoir region configured to collect the water portion of the fluid, wherein the first reservoir region comprises a first outlet configured to feed the water portion in a direction of the fluid outlet, and a second reservoir region comprising a second outlet configured to feed the water portion in the direction of the fluid outlet, wherein the first reservoir region is connected in series in terms of flow via the second reservoir region to the fluid outlet, wherein in an installation position of the separating device the first outlet is arranged lower than the second outlet, so that deposits of the water portion completely covering the first outlet are prevented from flowing away, wherein the first reservoir region comprises a bottom section and a supply section, wherein the bottom section has a smaller area in a horizontal plane than the supply section, the method comprising:
   collecting, during operation of the separating device, the water portion of the fluid in the first and in the second reservoir region,
   wherein the water portion runs away via the first and the second outlet,
   wherein deposits of the water portion completely covering the first outlet are prevented from flowing away,
   wherein upon freezing of the deposits the first outlet is blocked so that no water portion can pass via the first outlet into the fluid outlet.

* * * * *